E. C. GUNDELACH.
RETAINING DEVICE.
APPLICATION FILED AUG. 18, 1913.

1,114,469.

Patented Oct. 20, 1914.

WITNESSES

INVENTOR
Emil C. Gundelach
BY
ATTORNEYS

UNITED STATES PATENT OFFICE.

EMIL C. GUNDELACH, OF NEW ROCHELLE, NEW YORK, ASSIGNOR OF ONE-HALF TO FRANK G. RIKER, OF MOUNT VERNON, NEW YORK.

RETAINING DEVICE.

1,114,469.

Specification of Letters Patent.

Patented Oct. 20, 1914.

Application filed August 18, 1913. Serial No. 785,231.

*To all whom it may concern:*

Be it known that I, EMIL C. GUNDELACH, a citizen of the United States, and a resident of New Rochelle, in the county of Westchester and State of New York, have invented a new and Improved Retaining Device, of which the following is a full, clear, and exact description.

The invention relates to slip on couplings, such as are used for connecting the flexible discharge pipe of an air pump with the inlet valve of an inflatable vehicle tire, or other containing receptacle, either air, gas or fluid.

The object of the invention is to provide a new and improved retaining device, arranged to securely hold the slip on coupling in position on the valve stem while pumping up the tire, and to allow the user to conveniently and quickly place the retaining device in position on the valve stem or remove it therefrom simultaneously with the slip on coupling.

For the purpose mentioned use is made of a pair of spring jaws supported from the coupling and extending in front thereof to engage the stem of the inlet valve at the time the coupling is slipped onto the valve stem.

A practical embodiment of the invention is represented in the accompanying drawings forming a part of this specification in which similar characters of reference indicate corresponding parts in both views.

Figure 1:
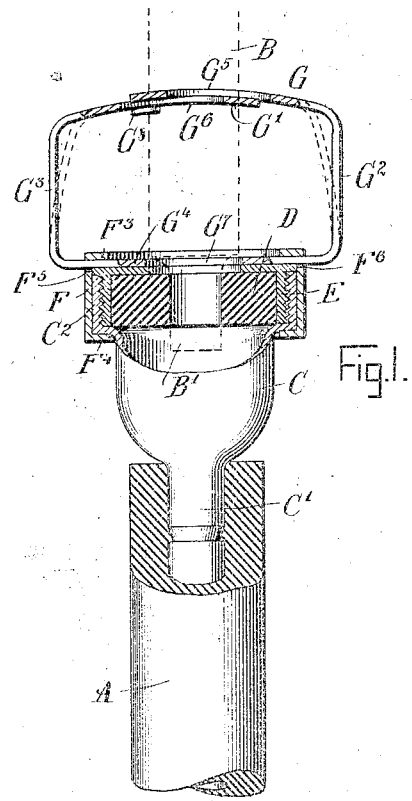
Figure 2:
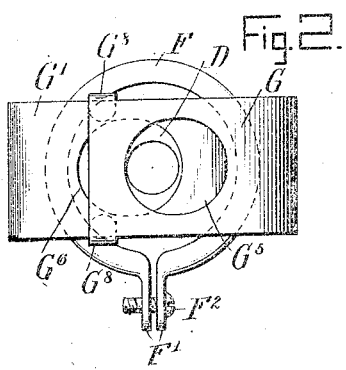

Figure 1 is a sectional side elevation of the retaining device in position on the coupling; and Fig. 2 is a plan view of the same.

The slip on coupling for connecting the flexible discharge pipe A of an air pump with the stem B of an inlet valve for an inflatable vehicle tire is of the usual construction and consists of the cup C provided at one end with a nipple $C^1$ engaging the tube A and provided at the other end with an annular flange $C^2$ in which is held a rubber washer D by the use of a screw cap E screwing in the flange $C^2$, the said washer D being adapted to engage the reduced end $B^1$ of the valve stem B, as indicated in Fig. 1.

The retaining device consists essentially of two parts, of which one is in the form of a clamping band F encircling the flange $C^2$, and the other part is in the form of a pair of overlapping apertured jaws G, $G^1$ adapted to engage the valve stem B a distance from the reduced end $B^1$ thereof, as plainly indicated in Fig. 1. The clamping band F is provided with the usual lugs $F^1$ connected with each other by a screw $F^2$ to securely clamp the band F in position on the flange $C^2$. The band F is provided with inwardly-extending top and bottom flanges $F^3$, $F^4$ to securely hold the clamping band F against endwise movement on the flange $C^2$. The jaws G, $G^1$ extend in opposite directions and terminate in side arms $G^2$, $G^3$ connected with each other by a base or connecting member $G^4$ extending through slots $F^5$, $F^6$ formed in the band F at diametrically opposite points so that the base $G^4$ extends centrally across the slip on coupling and the jaws G, $G^1$ are held in front of the slip on coupling to engage the valve stem B a distance from the reduced end B thereof. The jaws G, $G^1$, side arms $G^2$, $G^3$ and base $G^4$ are preferably made of spring steel, and the jaws G, $G^1$ are provided with apertures $G^5$, $G^6$ for the passage of the valve stem B. The apertures $G^5$, $G^6$ are normally out of register with each other and can only be moved in register by pressing the side arms $G^2$, $G^3$ toward each other, as indicated in dotted lines in Fig. 1, to permit of engaging the apertures $G^5$, $G^6$ with the valve stem B. When the operator releases the side arms $G^2$, $G^3$ the jaws G and $G^1$ move outward in the opposite direction so that the outer walls of the apertures $G^5$, $G^6$ clampingly engage the opposite sides of the stem B to securely hold the slip on coupling in position on the reduced end $B^1$ of the valve stem B. The base $G^4$ is provided with an opening $G^7$ arranged centrally relative to the slip on coupling so as to provide a passage for the reduced end $B^1$ of the valve stem B when placing the slip on coupling and the retaining device in position on the valve stem B.

The jaw G is provided with guide lugs $G^8$ engaging the other jaw G' to hold the jaws against lateral movement one relatively to the other or to allow the jaws to slide one over the other in opening or closing the jaws as above mentioned. The slots $F^5$, $F^6$ are arranged in the clamping band F immediately below the top flange $F^3$ so that the base $G^4$ extends under the flange $F^3$ and overlies the screw cap E used for holding the washer D in place. By the arrangement described a firm support is given to the base G⁴ when in position on the slip on coupling.

From the foregoing it will be seen that by the arrangement described the jaws G, G¹, when pressed inward, can be readily engaged with the stem B, and at the same time the slip on coupling is coupled in position on the reduced end B¹ of the stem B, and when the jaws are released by the operator they firmly engage the stem B so that the slip on coupling is not liable to slip off during the time o° pumping up the vehicle tire.

The retaining device shown and described is very simple and durable in construction and can be cheaply manufactured and readily applied to slip on couplings as now generally constructed.

Having thus described my invention, I claim as new and desire to secure by Letters Patent:

1. A retaining device for slip on couplings for inlet valves of inflatable tires, comprising a band having lugs connected with each other by a bolt to permit it to be clamped in position, said band having oppositely arranged slots, and apertured spring jaws extending out through the slots of the band, said jaws overlapping one another and one of the said jaws being provided at each side edge with a lug engaging the other jaw.

2. A retaining device for slip on couplings for inlet valves of inflatable tires, comprising a clamping band adapted to be secured to the coupling, and spring jaws, said jaws extending from opposite sides of the band and having upwardly extending arms terminating in inwardly extending and overlapping apertured ends, one of the jaws being provided at each side edge with a lug engaging its other jaw.

3. A retaining device for slip on couplings for inlet valves of inflatable vehicle tires, comprising a clamping band encircling the coupling and provided with top and bottom flanges engaging the coupling to hold the band against lengthwise movement on the coupling, and apertured jaws overlapping one the other and extending in opposite directions, the ends of the jaws terminating in side arms connected with each other by an apertured base member held in the said clamping band.

4. A retaining device for slip on couplings for inlet valves of inflatable vehicle tires, comprising a clamping band encircling the coupling and provided with top and bottom flanges engaging the coupling to hold the band against lengthwise movement on the coupling, and apertured jaws overlapping one the other and extending in opposite directions, the ends of the jaws terminating in side arms connected with each other by an apertured base member, the said clamping band being provided with slots for the passage of the said base member, the slots being adjacent the said top flange and the aperture of the said base member being central on the coupling.

5. A retaining device for slip on couplings for inlet valves of inflatable vehicle tires, comprising a clamping band encircling the coupling and provided with top and bottom flanges engaging the coupling to hold the band against lengthwise movement on the coupling, and apertured jaws overlapping one the other and extending in opposite directions, the ends of the jaws terminating in side arms connected with each other by an apertured base member held in the said clamping band, one of the said jaws having guide lugs slidingly engaging the other jaw.

In testimony whereof I have signed my name to this specification in the presence of two subscribing witnesses.

EMIL C. GUNDELACH.

Witnesses:
  GEO. L. BEELER,
  PHILIP D. ROLLHAUS.